United States Patent
Belghoul et al.

(10) Patent No.: US 9,955,398 B2
(45) Date of Patent: Apr. 24, 2018

(54) WLAN / CELLULAR INTERWORKING BASED ON MOBILITY INFORMATION

(71) Applicant: Apple Inc., Cupertino, CA (US)

(72) Inventors: Farouk Belghoul, Campbell, CA (US); Tarik Tabet, Los Gatos, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 162 days.

(21) Appl. No.: 15/013,335

(22) Filed: Feb. 2, 2016

(65) Prior Publication Data

US 2016/0295482 A1 Oct. 6, 2016

Related U.S. Application Data

(60) Provisional application No. 62/140,152, filed on Mar. 30, 2015.

(51) Int. Cl.
*H04W 36/22* (2009.01)
*H04W 36/14* (2009.01)
(Continued)

(52) U.S. Cl.
CPC ........... *H04W 36/22* (2013.01); *H04W 36/14* (2013.01); *H04W 36/32* (2013.01);
(Continued)

(58) Field of Classification Search
CPC ..... H04W 12/06; H04W 12/08; H04W 48/02; H04W 48/04; H04W 84/12; H04W 88/06;
(Continued)

(56) References Cited

U.S. PATENT DOCUMENTS 8,570,993 B2 10/2013 Austin et al.
2014/0171088 A1 6/2014 Edara et al.
(Continued)

FOREIGN PATENT DOCUMENTS

WO WO 2014/112595 7/2014
WO 2015175468 A1 11/2015

OTHER PUBLICATIONS

IWritten Opinion of the International Examining Authority for PCT/US2016/020210, dated Feb. 27, 2017, 17 pages.
(Continued)

*Primary Examiner* — Awet Haile
(74) *Attorney, Agent, or Firm* — Meyertons Hood Kivlin Kowert & Goetzel, P.C.; Jeffrey C. Hood

(57) ABSTRACT

In at least some embodiments, a method, apparatus, and system for performing communication using a plurality of radio access technologies (RATs) including a cellular RAT and a short-range RAT. A mobile device may be configured to receive information regarding traffic steering, i.e., cellular/short-range RAT handover, from nearby short-range access points and/or from a cellular base station. The mobile device may generate or determine mobility information of the mobile device, which indicates an amount of movement of the mobile device. The mobile device may determine whether the mobile device should transition between the cellular RAT and the short-range RAT based at least in part on the traffic-steering information and the mobility information. The mobile device may selectively transition between the cellular RAT and the short-range RAT based on the determination.

19 Claims, 8 Drawing Sheets

(51) Int. Cl.
  *H04W 36/32* (2009.01)
  *H04W 84/04* (2009.01)
  *H04W 84/12* (2009.01)
  *H04W 88/06* (2009.01)
  *H04W 36/00* (2009.01)

(52) U.S. Cl.
  CPC ...... *H04W 36/0094* (2013.01); *H04W 84/042* (2013.01); *H04W 84/12* (2013.01); *H04W 88/06* (2013.01)

(58) Field of Classification Search
  CPC . H04W 36/0094; H04W 36/14; H04W 36/22; H04W 36/32; H04W 84/042
  See application file for complete search history.

(56) References Cited

U.S. PATENT DOCUMENTS

2014/0192643 A1* 7/2014 Kalapatapu ........... H04W 48/00 370/230
2014/0287717 A1* 9/2014 Golaup ................. H04W 48/02 455/411
2015/0117406 A1 4/2015 Kim et al.
2016/0373994 A1* 12/2016 Yiu ..................... H04W 64/006

OTHER PUBLICATIONS

International Search Report and Written Opinion for PCT/US2016/020210, dated Jun. 2, 2016, 1-21 pages.
Catt: "Impact of UE speed for WLAN/3GPP Radio Interworking," 3GPP TSG RAN WG2 Meeting #81bis, R2-130970, Chicago, USA, Apr. 15-19, 2013, pp. 1-2.
Broadcom Corporation: "Some Considerations for developing RAN rules for WLAN/3GPP Radio Interworking," 3GPP TSG-RAN WG2 Meeting #86, R2-142071, Seoul, South Korea, May 19-23, 2014, pp. 1-6.
Alcatel-Lucent, Alcatel-Lucent Shanghai Bell: "On UE-speed-aware methods for improving the mobility performance in HetNets," 3GPP TSG-RAN WG2 Meeting #75bis, R2-115211, Zhuhai, China, Oct. 10-14, 2011, pp. 1-4.

* cited by examiner

WLAN / CELLULAR INTERWORKING BASED ON MOBILITY INFORMATION

PRIORITY CLAIM

The present application claims benefit of priority to provisional patent application 62/140,152 titled "Wi-Fi/Cellular Internetworking Based on Mobility Information" filed on Mar. 30, 2015, which is hereby incorporated by reference in its entirety as though fully and completely set forth herein.

FIELD

The present application relates to wireless communication, and more particularly, to techniques relating to handovers between different radio access technologies.

DESCRIPTION OF THE RELATED ART

Many modern smartphones and other mobile devices are capable of both long-range (e.g., cellular) and short-range (e.g., WLAN or Wi-Fi) connectivity. Additionally, short-range network technology is widespread, and a number of WLAN access points in the form of either trusted or untrusted access points have been deployed. To leverage the availability of WLAN technology, such as Wi-Fi, telecommunications standards have defined various mechanisms related to WLAN/cellular interworking, i.e., network utilization of both WLAN and cellular systems to convey network traffic. These mechanisms are generally intended to improve user connectivity, balance network traffic, and conserve device and network resources, as well as to serve other purposes.

Thus, at different times mobile devices may communicate using different radio access technologies (RATs) and may selectively transition between these technologies. In particular, mobile devices may perform handover between cellular and Wi-Fi networks based on various criteria. However, handover processes have certain drawbacks, such as the potential to disrupt device connectivity and burden device and network resources. Thus, improvements in the field are desired.

SUMMARY

Embodiments are presented related to a mobile device, such as a user equipment device (UE), that is able to perform handovers between long-range wireless networks (e.g., cellular networks) and short-range wireless networks (e.g., WLAN or Wi-Fi networks). In some embodiments, the mobile device may comprise at least one antenna and one or more radios coupled to the at least one antenna. The mobile device may be configured to communicate using a plurality of radio access technologies (RATs) including a cellular RAT and a short-range RAT, such as Wi-Fi.

The mobile device may be configured to receive information regarding traffic steering, i.e., information usable in directing and transitioning mobile device communications between different wireless networks or RATs. This traffic-steering information may include information regarding proximate access points as well as information regarding allowable levels of device motion for handover, such as authorized mobility states that would allow the mobile device to transition to a target network. This traffic-steering information may be generated at least in part based on a configuration and/or estimated range of one or more access points proximate to the mobile device.

The mobile device may also be configured to generate information regarding its own current or estimated state of movement, e.g., its mobility estate. To determine its current state of motion, or mobility state, a mobile device may consider the number of reselection or handover events it has performed during a time period defined by its network. The mobile device may also determine its mobility state based on internal sensors, such as gyroscopes, and/or other location parameters, e.g., determined from proximate Wi-Fi access points.

The mobile device may monitor and perform various measurements of the cellular and short-range networks, e.g., to determine the relative signal strengths of signals from these networks. In some embodiments, the mobile device may only perform these measurements if a current mobility state of the mobile device is an authorized mobility state for performing handover, e.g., for performing cellular/Wi-Fi offloading. This may serve to reduce power expenditure, as these measurements may not be performed if the mobility state of the mobile device is such that a transition to Wi-Fi would not be desirable, such as if the mobile device were moving so quickly that transitioning to the short-range Wi-Fi access point would not be feasible.

The mobile device may then determine whether it should transition between the cellular RAT and the short-range RAT based at least in part on the traffic-steering information (e.g., authorized mobility states received from the network), information regarding the source and/or target networks (e.g., RSSI) measurements, and/or the mobility state information generated by the mobile device. For example, the mobile device may be configured to determine whether it should transition from the cellular RAT to the short-range RAT based at least in part on a current mobility state of the mobile device being one of the authorized mobility states for cellular/short-range RAT offloading.

In some embodiments, in determining whether the mobile device should transition from the cellular RAT to the short-range RAT, the mobile device may be configured to compare at least one measured received signal strength indicator (RSSI) of a cellular beacon signal or Wi-Fi beacon signal to a threshold. The mobile device may be configured to use a scaling factor to adjust one or more of an amount of measured RSSI or an RSSI threshold used in determining whether the mobile device should transition from the cellular RAT to the short-range RAT. The at least one scaling factor may be based on a current mobility state of the mobile device such that a higher amount of Wi-Fi RSSI may be required for transitioning from cellular to Wi-Fi when the mobile device is in a high mobility state and a lower amount of Wi-Fi RSSI may be needed for transitioning from cellular to Wi-Fi when the mobile device is in a low mobility state. The at least one scaling factor may be received from the cellular base station and/or modified or generated internally by the mobile device.

The mobile device may then selectively perform handover, e.g., transition between the cellular RAT and the short-range RAT, based on the determination.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
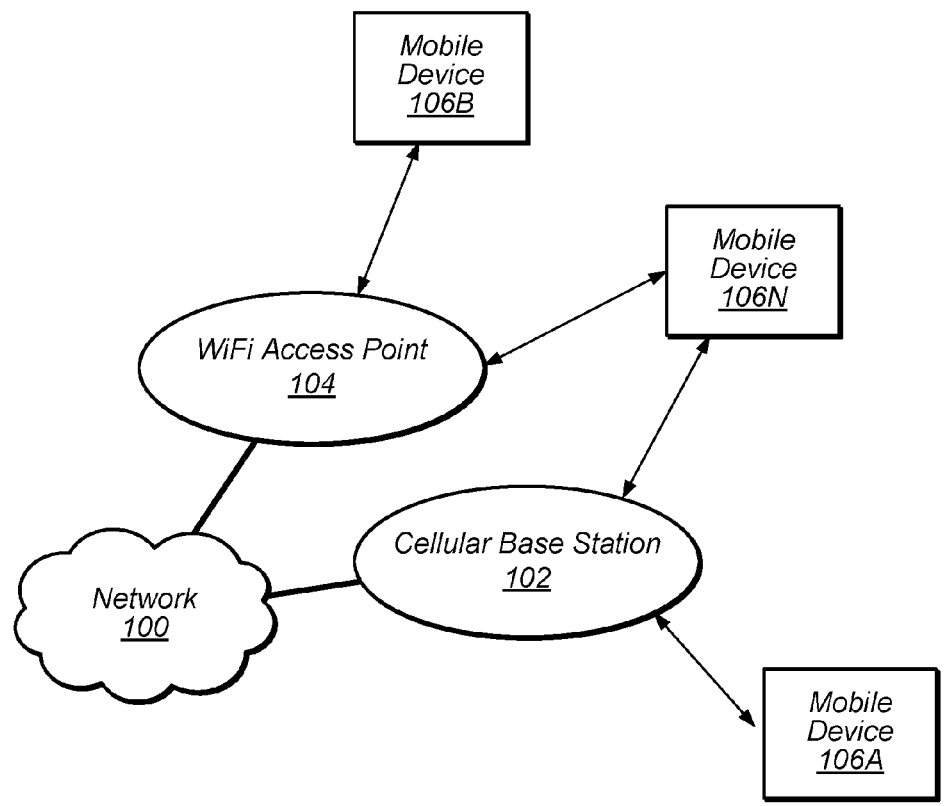
FIG. 1 illustrates an example (and simplified) wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

The present disclosure describes embodiments in which various techniques may be used to improve communications that transition between short-range wireless networks and long-range wireless networks.

Acronyms

The following acronyms are used in the present disclosure.
BS: Base Station
AP: Access Point
LTE: Long Term Evolution
VoLTE: Voice over LTE
IMS: IP Multimedia Subsystem
RAT: Radio Access Technology
TX: Transmit
RX: Receive
WLAN: Wireless Local Area Network
PDN: Packet Data Network
PGW: PDN Gateway
SGW: Serving Gateway
ePDG: evolved Packet Data Gateway Glossary The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Mobile Device—any of various types of communication devices that are mobile and are capable of communicating on a cellular network and a non-cellular network, such as Wi-Fi. A UE is an example of a mobile device.

Mobility/Mobility State—The word "mobility" (and derived forms, e.g., "mobile") retains the full breadth of its ordinary meaning, as well as additional meaning as intended in the art. In ordinary or non-technical language the term "mobility" typically denotes an ability to move, i.e., movability (as well as portability, etc.). However, in the context of mobile devices and wireless communications technologies, and as used herein, the term "mobility" may refer not only to the ability to move, but also to movement/motion itself. Thus, the "mobility state" of a mobile device may refer to the state or degree of movement/motion that the mobile device is presently experiencing (or that the mobile device is determined or estimated to experience). A "high mobility state" may then connote a state of a high level of movement, and a "low mobility state" may connote a low-movement state. Similarly, a mobile device may be referred to as being "mobile" if it is moving or in motion.

Base Station—The term "Base Station" has the full breadth of its ordinary meaning, and at least includes a wireless communication station installed at a fixed location and used to communicate as part of a wireless cellular telephone system or cellular radio system.

Access Point—This term has the full breadth of its ordinary meaning, and at least includes a wireless communication device that offers connectivity to a wireless local area network (WLAN), such as a Wi-Fi network.

Wi-Fi—This term has the full breadth of its ordinary meaning, and at least includes a wireless local area network technology based on the IEEE (Institute of Electrical and Electronics Engineers) 802.11 standards, and future revisions or enhancements to those standards.

WLAN—This term has the full breadth of its ordinary meaning, and may be used to describe a variety of short-range networks, such as Wi-Fi networks.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as combinations of the above.

Channel/Link—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
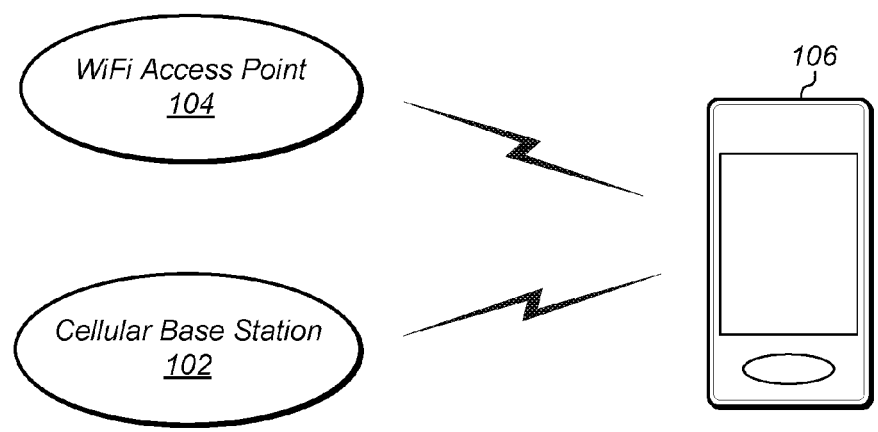
FIG. 2 illustrates a mobile device in communication with a cellular base station and an access point (AP), according to some embodiments.

FIGS. 1 and 2—Communication System

FIG. 1 illustrates an example (and simplified) wireless communication system. It is noted that the system of FIG. 1 is merely one example of a possible system, and disclosed embodiments may be implemented in any of various systems, as desired.

As shown, the example wireless communication system includes a cellular base station 102 which may communicate over a transmission medium with one or more mobile devices 106A, 106B, etc., through 106N. Each of the mobile devices may be, for example, a "user equipment device" (UE) or other types of devices as defined above.

The base station 102 may be a base transceiver station (BTS) or cell site, and may include hardware that enables wireless cellular communication with the mobile devices 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the mobile devices and/or between the mobile devices and the network 100.

The communication area (or coverage area) of the base station may be referred to as a "cell." The base station 102 and the mobile devices 106 may be configured to communicate over the transmission medium using any of various cellular radio access technologies (RATs), also referred to as wireless cellular communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc. A typical wireless cellular communication system will include a plurality of cellular base stations that provide different coverage areas or cells, with handoffs between cells.

Additionally, the example wireless communication system may include one or more wireless access points (such as access point 104) which may be communicatively coupled to the network 100. Each wireless access point 104 may provide a wireless local area network (WLAN) for communication with mobile devices 106. These wireless access points may comprise Wi-Fi access points. Wireless access point 104 may be configured to support cellular network offloading and/or otherwise provide wireless communication services as part of the wireless communication system illustrated in FIG. 1.

Cellular base station 102 and other similar base stations, as well as access points (such as access point 104) operating according to a different wireless communication standard (e.g., Wi-Fi), may thus be provided as a network which may provide continuous or nearly continuous overlapping service to mobile devices 106 and similar devices over a wide geographic area via one or more wireless communication standards.

Thus, while base station 102 may act as a "serving cell" for a mobile device 106 as illustrated in FIG. 1, each mobile device 106 may also be capable of receiving signals from (and possibly within communication range of) one or more other cells (which might be provided by other base stations (not shown) and/or wireless local area network (WLAN) access points, which may be referred to as "neighboring cells" or "neighboring WLANs" (e.g., as appropriate), and/or more generally as "neighbors".

FIG. 2 illustrates mobile device 106 (e.g., one of the devices 106A through 106N) in communication with both a Wi-Fi access point 104 and a cellular base station 102. The mobile device 106 may be a device with both cellular communication capability and non-cellular communication capability, e.g., Wi-Fi capability, such as a mobile phone, a hand-held device, a computer or a tablet, a wearable device, or virtually any type of wireless device.

The mobile device 106 may include a processor that is configured to execute program instructions stored in memory. The mobile device 106 may perform any of the method embodiments described herein by executing such stored instructions. Alternatively, or in addition, the mobile device 106 may include a programmable hardware element such as an FPGA (field-programmable gate array) that is configured to perform any of the method embodiments described herein, or any portion of any of the method embodiments described herein.

In some embodiments, the mobile device 106 may be configured to communicate using any of multiple radio access technologies/wireless communication protocols. For example, the mobile device 106 may be configured to communicate using any of various cellular communication technologies, such as GSM, UMTS, CDMA2000, LTE, LTE-A, etc. The mobile device may also be configured to communicate using any of various non-cellular communication technologies such as WLAN/Wi-Fi, or GNSS. Other combinations of wireless communication technologies are also possible. The mobile device may also be able to selectively hand off between a cellular radio access technology (RAT) and a short-range wireless RAT, such as Wi-Fi.

The mobile device 106 may include one or more antennas for communicating using one or more wireless communication protocols or technologies. In some embodiments, the mobile device 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the mobile device 106 may share one or more parts of receive and/or transmit chains between multiple wireless communication technologies, such as those discussed above.

In some embodiments, the mobile device 106 may include separate transmit and/or receive chains (e.g., including separate RF and/or digital radio components) for each wireless communication protocol with which it is configured to communicate. As a further possibility, the mobile device 106 may include one or more radios which are shared between multiple wireless communication protocols, and one or more radios which are used exclusively by a single wireless communication protocol. For example, the mobile device 106 might include a shared radio for communicating using either of LTE or 1×RTT (or LTE or GSM), and separate radios for communicating using each of Wi-Fi and Bluetooth. Other configurations are also possible.

Figure 3:
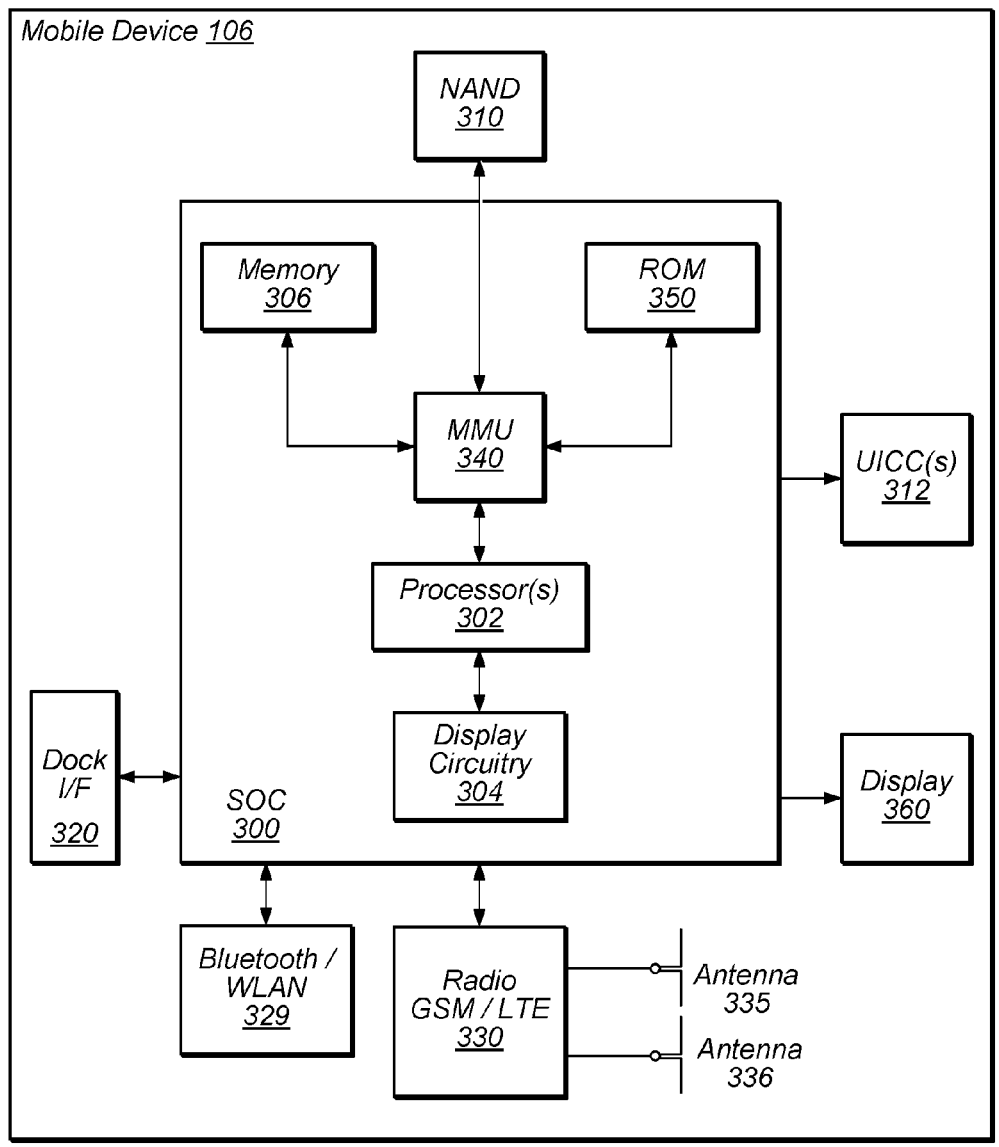
FIG. 3 illustrates an example block diagram of a mobile device, according to some embodiments.

FIG. 3—Mobile Device Block Diagram

FIG. 3 illustrates an example simplified block diagram of a mobile device 106. As shown, the mobile device 106 may include a system on chip (SOC) 300, which may include portions for various purposes. The SOC 300 may be coupled to various other circuits of the mobile device 106. For example, the mobile device 106 may include various types of memory (e.g., including Flash 310), a connector interface 320 (e.g., for coupling to a computer system, dock, charging station, etc.), the display 360, cellular communication circuitry 330 such as for LTE, GSM, etc., and short-range wireless communication circuitry 329 (e.g., Bluetooth™ and WLAN circuitry). The mobile device 106 may further comprise one or more smart cards 312 that comprise SIM (Subscriber Identity Module) functionality, such as one or more UICC(s) (Universal Integrated Circuit Card(s)) cards 312, or the SIM functionality may be contained in an embedded memory. The cellular communication circuitry 330 may couple to one or more antennas, preferably two antennas 335 and 336 as shown. The short-range wireless communication circuitry 329 may also couple to one or both of the antennas 335 and 336 (this connectivity is not shown for ease of illustration).

As shown, the SOC 300 may include processor(s) 302, which may execute program instructions for the mobile device 106, and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read-only memory (ROM) 350, Flash memory 310) and/or to other circuits or devices, such as the display circuitry 304, cellular communication circuitry 330, short-range wireless communication circuitry 329, connector I/F 320, and/or display 360. The MMU 340 may be configured to perform memory protection and page table translation or setup. In some embodiments, the MMU 340 may be included as a portion of the processor(s) 302.

In some embodiments, as noted above, the mobile device 106 comprises at least one smart card 312, such as a UICC 312, which executes one or more Subscriber Identity Module (SIM) applications and/or otherwise implements SIM functionality. The at least one smart card 312 may be only a single smart card 312, or the mobile device 106 may comprise two or more smart cards 312. Each smart card 312 may be embedded, e.g., may be soldered onto a circuit board in the mobile device 106, or each smart card 312 may be implemented as a removable smart card, an electronic SIM (eSIM) or any combination thereof. Any of various other SIM configurations are also contemplated.

As noted above, the mobile device 106 may be configured to communicate wirelessly using multiple radio access technologies (RATs). The mobile device 106 may be configured to communicate according to a Wi-Fi RAT and/or one or more cellular RATs, e.g., such as selectively communicating on the cellular RAT and Wi-Fi RAT at different times, or communicating on both Wi-Fi and cellular at the same time. For example, the mobile device 106 may be communicating on a primary communication channel (such as Wi-Fi), and in response to detected criteria, which may include degradation of the primary communication channel, may establish a secondary communication channel (such as on cellular). Alternatively, the mobile device 106 may be communicating on a primary communication channel (such as cellular), and in response to detected criteria, which may include degradation of the primary communication channel, may establish a secondary communication channel (such as on Wi-Fi). The mobile device 106 may operate to dynamically establish and/or remove different primary and/or secondary communication channels as needed, e.g., to provide the best user experience while attempting to minimize cost.

As described herein, the mobile device 106 may include hardware and software components for implementing the features and methods described herein. The processing element (or processor) 302 of the mobile device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the mobile device 106, in conjunction with one or more of the other components 300, 304, 306, 310, 320, 330, 335, 340, 350, 360 may be configured to implement part or all of the features described herein.

Figure 4:
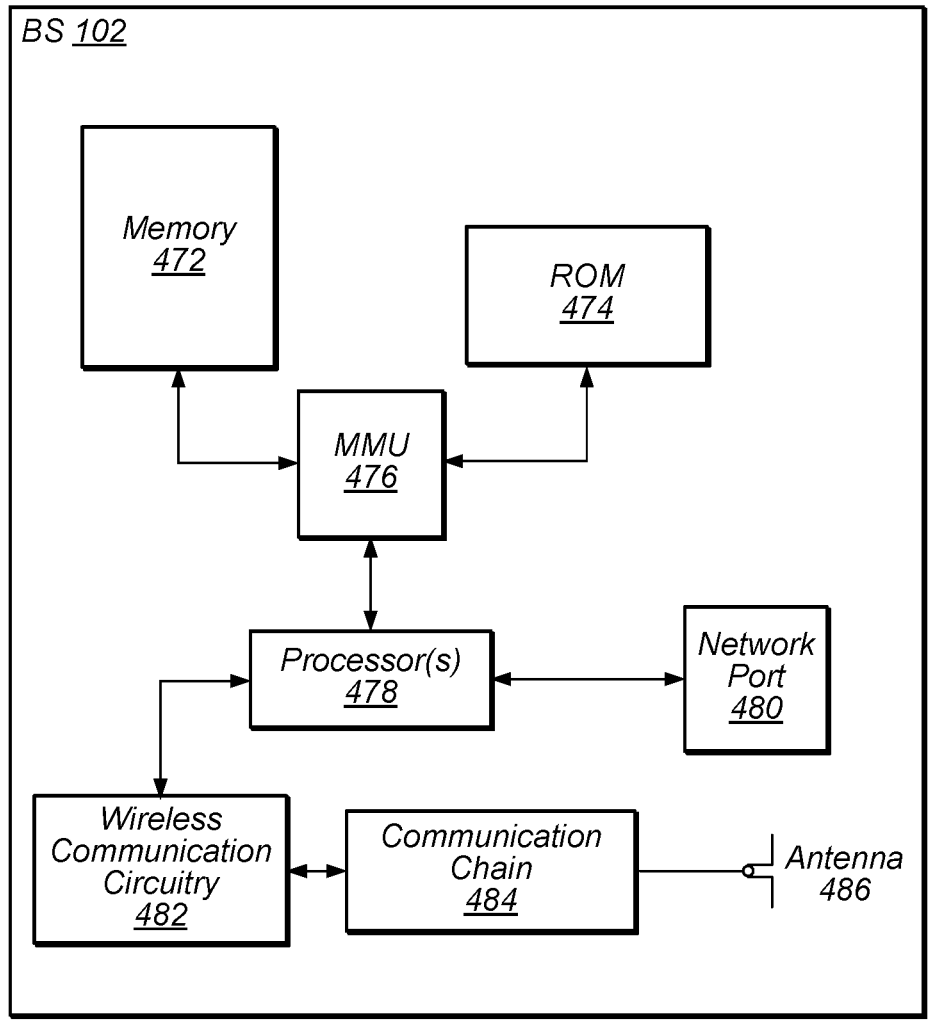
FIG. 4 illustrates an example block diagram of a cellular base station, according to some embodiments.

FIG. 4—Base Station Block Diagram

FIG. 4 illustrates an example block diagram of a base station 102. It is noted that the base station 102 of FIG. 4 is merely one example of a possible base station. As shown, the base station 102 may include processor(s) 478 which may execute program instructions for the base station 102. The processor(s) 478 may also be coupled to memory management unit (MMU) 476, which may be configured to receive addresses from the processor(s) 478 and translate those addresses to locations in memory (e.g., memory 472 and read-only memory (ROM) 474) or to other circuits or devices.

The base station 102 may include at least one network port 480. The network port 480 may be configured to couple to a cellular network, e.g., a core network of a cellular service provider. The core network may provide mobility-related services and/or other services to a plurality of devices, such as mobile devices 106. In some cases, the network port 480 may couple to a telephone network via the core network, and/or the core network may provide a telephone network (e.g., among other mobile devices serviced by the cellular service provider).

The base station 102 may include at least one antenna 486, and possibly multiple antennas. The at least one antenna 486 may be configured to operate as a wireless cellular transceiver and may be further configured to communicate with mobile devices 106 via wireless communication circuitry 482. The antenna 486 communicates with the wireless communication circuitry 482 via communication chain 484. Communication chain 484 may be a receive chain, a transmit chain or both. The wireless communication circuitry 482 and the communication chain 484 may compose a radio. The radio may be configured to communicate via various cellular network standards, including, but not limited to UMTS, and LTE based standards, including LTE-Advanced. Access point 104 may also be described according to the block diagram of FIG. 4, except that communication may be performed using any of various Wi-Fi communication technologies.

Figure 5:
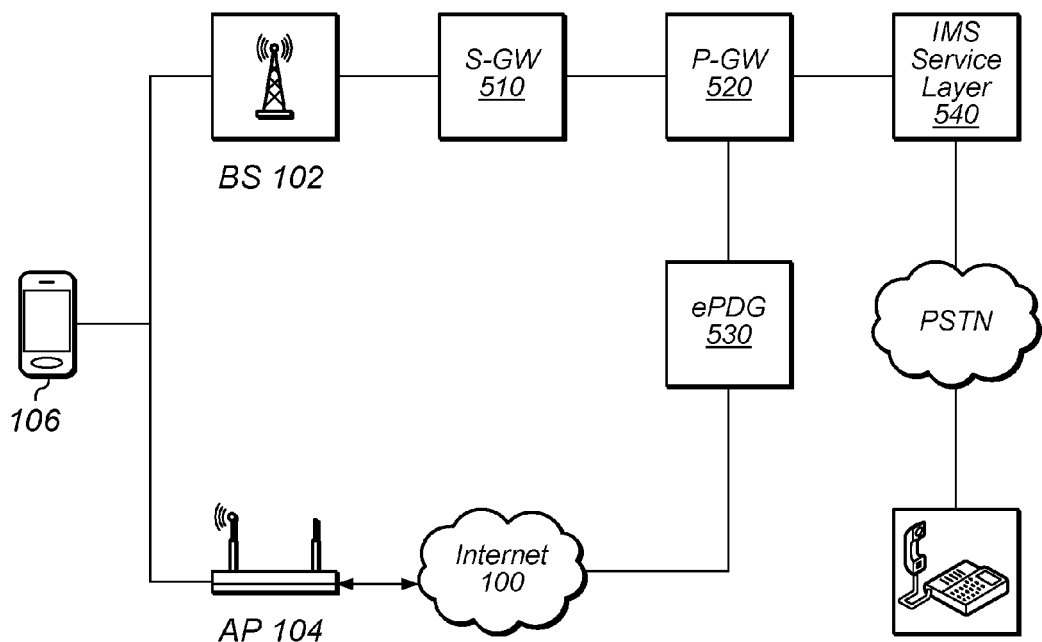
FIG. 5 is a block diagram of an example communication system including a base station and a Wi-Fi access point, according to some embodiments.

FIG. 5—Example Wireless Communication System

FIG. 5 illustrates an example wireless communication system according to some embodiments. As shown, the mobile device 106 may communicate with a cellular network via cellular base station (BS) 102. The cellular base station 102 may communicate with a Serving Gateway (SGW) 510. In some embodiments, the SGW 510 is responsible for handovers with neighboring base stations. As represented in the illustration, in some embodiments SGW 510 couples to a Packet Data Network (PDN) Gateway, or (PGW) 520. As shown, evolved Packet Data Gateway (ePDG) 530 operates to interface between the cellular and Wi-Fi networks. PGW 520 assigns device IP addresses of the iWLAN tunnel interface and the cellular interface. Together ePDG 530, SGW 510 and PGW 520 make up the evolved packet core (EPC).

As shown, mobile device 106 may also communicate with a Wi-Fi access point (AP) 104, where the Wi-Fi access point presents a Wi-Fi network. The Wi-Fi access point 104 may couple through a network, such as the Internet, to the evolved Packet Data Gateway (ePDG) 530. The ePDG 530 is utilized in the network function of 4G mobile core networks, known as the evolved packet core (EPC) mentioned above, as well as future mobile networks, such as 5G networks. As noted above, the ePDG 530 may act as an interface between the EPC and non-3GPP networks that may use secure access, such as Wi-Fi and femtocell access networks.

The PGW may function as an inter-RAT mobility anchor. The PGW 520 may couple to an IMS (IP Multimedia Subsystem) server. The IMS server may comprise a computer system with a processor and memory which performs various operations as described herein. The IMS server may implement an IMS Service Layer 540. The IMS server may also implement a Proxy Call Session Control Function (P-CSCF). The P-CSCF may act as the entry point to the IMS domain and may serve as the outbound proxy server for the mobile device. The mobile device may attach to the P-CSCF prior to performing IMS registrations and initiating SIP sessions. The P-CSCF may be in the home domain of the IMS operator, or it may be in the visiting domain where the mobile device is currently roaming.

The IMS server may couple to other networks such as the public switched telephone network (PSTN) or other types of communication networks, e.g., for communicating with other communication devices, such as a standard POTS telephone (shown), another mobile device, etc.

Figure 6:
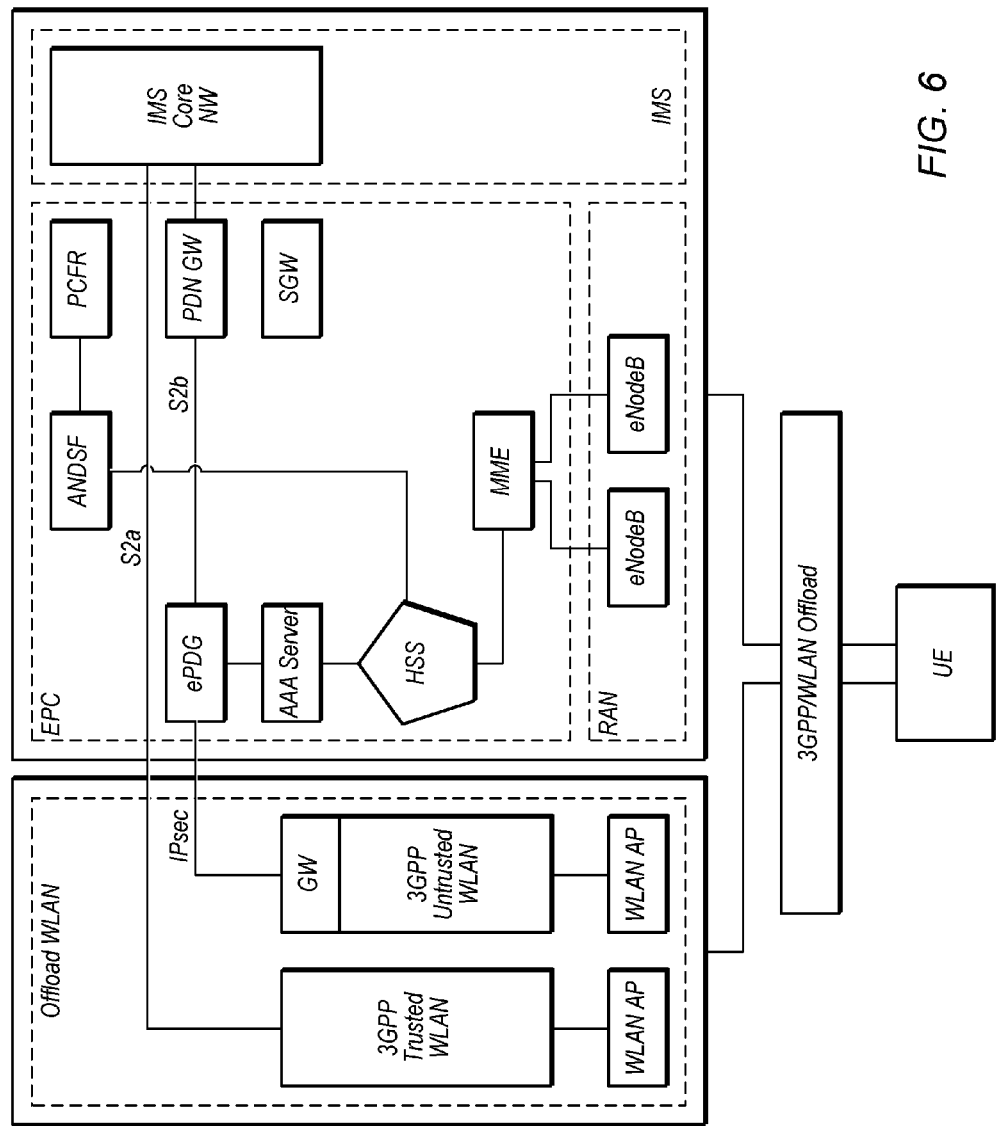
FIG. 6 is a more detailed block diagram of an example communication system including a base station and a Wi-Fi access point, according to some embodiments.

FIG. 6—Example Wireless Communication System

FIG. 6 illustrates a more detailed example of a wireless communication system. FIG. 6 illustrates a more detailed block diagram of the evolved packet core (EPC) having several cellular base stations, each referred to as eNodeB.

A WLAN is also shown containing two WLAN access points, referred to as WLAN APs. In particular, the WLAN APs may be Wi-Fi access points, as shown. In the illustrated system, the Wi-Fi access points are of two differing types: a first type coupled to a 3GPP trusted WLAN, and a second type coupled to a 3GPP untrusted WLAN. The Wi-Fi access point that is coupled to the 3GPP trusted WLAN is coupled directly to the core network of a cellular provider, and may be a Wi-Fi access point operated by the cellular provider. In contrast, the Wi-Fi access point coupled to the 3GPP untrusted WLAN may not be operated by the cellular provider, and may be any type of WLAN network.

A mobile device 106, shown in FIG. 6 as mobile device, may perform 3GPP/WLAN offload between the cellular and WLAN networks, as described further below. More specifically, the mobile device may be currently communicating on a cellular network and may obtain information usable in determining whether to transition to using a Wi-Fi (WLAN) network for communication. For example, the mobile device may be conducting a Voice over LTE (VoLTE) call on the cellular network and may determine whether to transition to the Wi-Fi network for the VoLTE call. Alternatively, the mobile device may be currently communicating on a Wi-Fi (WLAN) network and may obtain information used in determining whether to transition to using a cellular network for communication.

Figure 7:
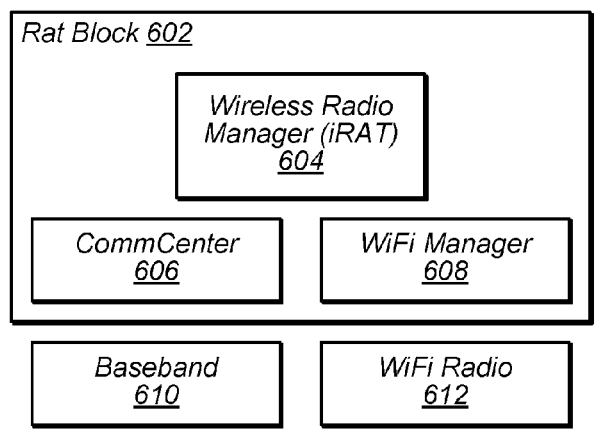
FIG. 7 illustrates various communication components present in the mobile device, according to some embodiments.

FIG. 7—Mobile Device Functionality

FIG. 7 illustrates example functionality that may be present in the mobile device 106. As shown, the mobile device 106 may comprise a RAT block 602 that comprises a wireless radio manager 604, a communication center (CommCenter) block 606, and a Wi-Fi manager block 608. The wireless radio manager 604 may be configured to receive various statistics from the communication center block 606 and/or the Wi-Fi manager block 608 and determine whether to use one or more of available cellular and Wi-Fi connections based on the statistics, as discussed further below. In some embodiments, the communication block 606 may manage or control baseband logic 610 (e.g., related to cellular communication), and Wi-Fi manager block 608 may manage or control Wi-Fi radio 612. Although not shown, the RAT block 602 may include a symptoms manager that may report current connection information (e.g., connection metrics or statistics) to the wireless radio manager 604. Elements of the RAT block 502 may be implemented as software or firmware executable by a processor.

Figure 8:
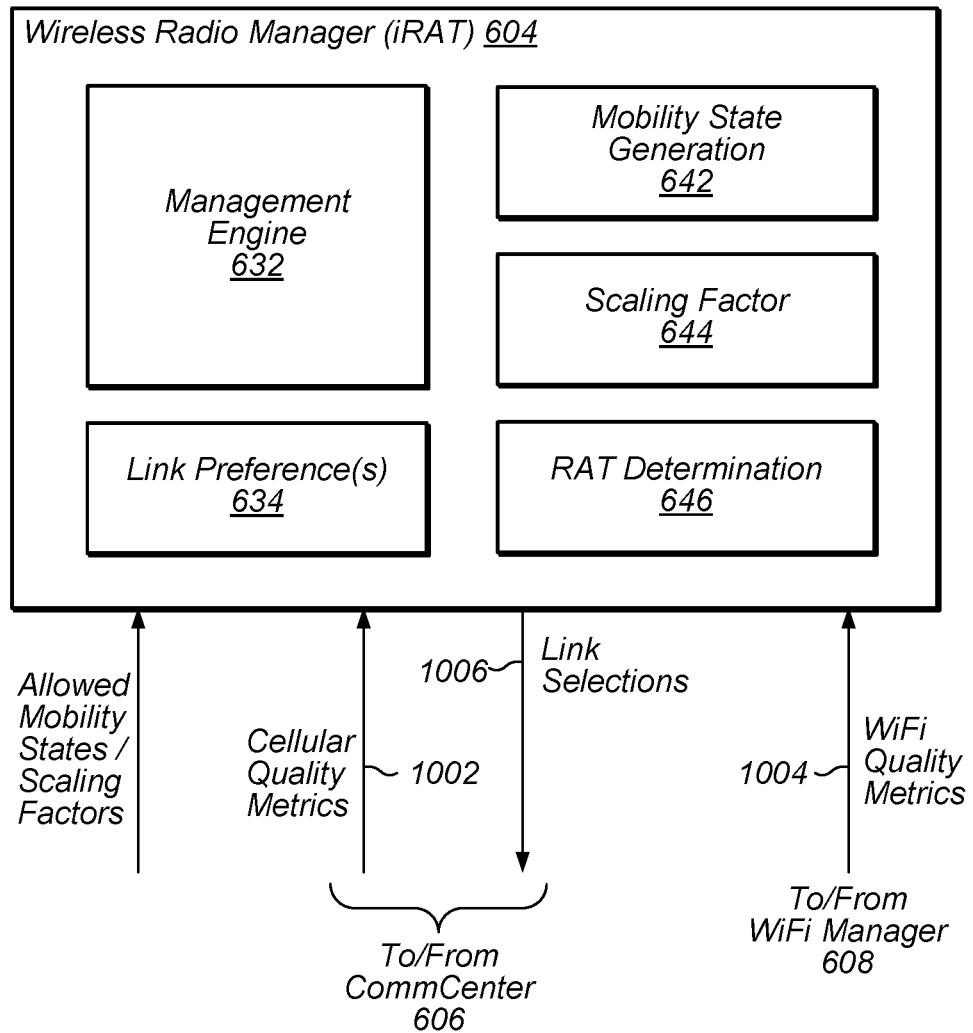
FIG. 8 illustrates various communication components present in the wireless radio manager of FIG. 7, according to some embodiments.

FIG. 8—Mobile Device Functionality

FIG. 8 illustrates further example functionality that may be present in the mobile device 106. More specifically, FIG. 8 illustrates functionality that may be contained in the wireless radio manager (iRAT) 604. As shown, the wireless radio manager 604 of the mobile device 106 may comprise a management engine 632, a memory 634 that stores link preference information, mobility state generation logic 642, scaling factor logic 644, and RAT determination logic 646.

As shown, the wireless radio manager (iRAT) 604 may receive information from the cellular network, e.g., from the cellular base station 102, regarding allowed mobility states, that is, mobility states that would permit the mobile device to transition to one or more proximate Wi-Fi access points. The wireless radio manager (iRAT) 604 may also receive information from the cellular network regarding scaling factors, which the mobile device may use in assessing received signal strength information (RSSI) from the base station and/or proximate access points.

The wireless radio manager (iRAT) 604 may also receive or determine cellular quality metric information 1002 from the CommCenter 606, which was obtained from the cellular network, and may receive Wi-Fi quality metric information from Wi-Fi Manager 608. As discussed further below, the mobile station may use the cellular quality metric information 1002, the Wi-Fi quality metric information 1004, information regarding acceptable mobility states for transitioning from cellular to Wi-Fi, and scaling factor information, in determining whether to transition from a cellular network to a Wi-Fi network.

Background: WLAN Interworking Procedures in Telecommunications Standards

Current and/or future versions of telecommunications standards have defined various mechanisms to allow for WLAN interworking, i.e., network utilization of both WLAN and cellular systems to convey network traffic. WLAN interworking involves selectively redirecting mobile device communications between short-range networks and cellular networks. This transitioning between different RATs (Radio Access Technologies), e.g., between WLAN and cellular technologies, may be referred to as mobile data offloading (or simply offloading), traffic steering, or traffic handover (or simply handover or handoff). The term "mobile data offloading" may also refer more specifically to the case of transitioning mobile devices from operating using cellular to operating using WLAN (e.g., Wi-Fi).

In particular, existing telecommunications standards allow for the following features related to WLAN interworking and traffic steering: (1) discovery of cellular operators' WLAN access points using cellular indications; and (2) traffic handover between cellular and WLAN for the purpose of balancing network traffic. To assist in determining when or whether a mobile device (e.g., mobile device 106) should initiate traffic handover, as well as to assist in performing handover, various conditions and items of information may be considered. For example, the 3GPP Release 12 Framework outlines a procedure for RAN-assisted WLAN interworking, whereby RAN assistance is used to facilitate traffic steering between E-UTRAN (Evolved UMTS Terrestrial Radio Access Network, associated with LTE) and WLAN.

According to the 3GPP Release 12 Framework, RAN assistance parameters may be provided to the mobile device using SystemInformationBlockType17 or RRCConnectionReconfiguration items. When current RAN assistance parameters undergo changes, upper layer protocols of the mobile device may be notified. Whether certain conditions involving these parameters are satisfied may dictate traffic steering, i.e., when, whether, or how traffic handover should occur. These traffic-steering rules and RAN assistance parameters, as described in the 3GPP Release 12 Framework, are further outlined below.

Namely, according to the 3GPP Release 12 Framework, the following RRC (Radio Resource Control) rules may be used to determine offloading from LTE (or E-UTRAN) to WLAN:

1. In the E-UTRAN serving cell:
   RSRPmeas<$\text{Thresh}_{ServingOffloadWLAN, LowP}$; or
   RSRQmeas<$\text{Thresh}_{ServingOffloadWLAN, LowQ}$.

2. In the target WLAN:
   ChannelUtilizationWLAN<
     $\text{Thresh}_{ChannelUtilizationWLAN, Low}$; and
   BackhaulRateDLWLAN>$\text{Thresh}_{BackhaulRateDLWLAN, High}$; and
   BackhaulRateULWLAN>$\text{Thresh}_{BackhaulRateULWLAN, High}$; and
   BeaconRSSI>$\text{Thresh}_{BeaconRSSIWLAN, High}$.

Similarly, according to the 3GPP Release 12 Framework, the following RRC rules may determine traffic steering from WLAN to LTE (or E-UTRAN):

3. In the source WLAN:
   ChannelUtilizationWLAN>
     $\text{Thresh}_{ChannelUtilizationWLAN, High}$; and
   BackhaulRateDLWLAN<$\text{Thresh}_{BackhaulRateDLWLAN, Low}$; and
   BackhaulRateULWLAN<$\text{Thresh}_{BackhaulRateULWLAN, Low}$; and
   BeaconRSSI<$\text{Thresh}_{BeaconRSSIWLAN, Low}$.

4. In the target E-UTRAN cell:
   RSRPmeas>$\text{Thresh}_{ServingOffloadWLAN, HighP}$; or
   RSRQmeas>$\text{Thresh}_{ServingOffloadWLAN, HighQ}$.

The above RRC rules refer to the following values, presented with their associated descriptions:

| Value | Description |
| --- | --- |
| ChannelUtilizationWLAN | WLAN channel utilization |
| BackhaulRateDLWLAN | WLAN download bandwidth |
| BackhaulRateULWLAN | WLAN upload bandwidth |
| BeaconRSSI | WLAN beacon received signal strength indication |
| RSRPmeas | Qrxlevmeas (measured cell RX level value) in RRC idle mode, and PCell RSRP in RRC connected mode |
| RSRQmeas | Qqualmeas (measured cell quality value) in RRC idle mode, and PCell RSRQ in RRC connected mode |

The above RRC rules also refer to the following RAN assistance parameters, presented with their associated descriptions:

| Parameter | Description |
| --- | --- |
| $\text{Thresh}_{ServingOffloadWLAN,LowP}$ | RSRP threshold (in dBm) used by the UE for traffic steering from E-UTRAN to WLAN |
| $\text{Thresh}_{ServingOffloadWLAN,HighP}$ | RSRP threshold (in dBm) used by the UE for traffic steering from WLAN to E-UTRAN |
| $\text{Thresh}_{ServingOffloadWLAN,LowQ}$ | RSRQ threshold (in dB) used by the UE for traffic steering from E-UTRAN to WLAN |
| $\text{Thresh}_{ServingOffloadWLAN,HighQ}$ | RSRQ threshold (in dB) used by the UE for traffic steering from WLAN to E-UTRAN |
| $\text{Thresh}_{ChannelUtilizationWLAN,Low}$ | WLAN channel utilization (BSS load) threshold used by the UE for traffic steering from E-UTRAN to WLAN |
| $\text{Thresh}_{ChannelUtilizationWLAN,High}$ | WLAN channel utilization (BSS load) threshold used by the UE for traffic steering from WLAN to E-UTRAN |
| $\text{Thresh}_{BackhaulRateDLWLAN,Low}$ | Backhaul available downlink bandwidth threshold used by the UE for traffic steering from WLAN to E-UTRAN |
| $\text{Thresh}_{BackhaulRateDLWLAN,High}$ | Backhaul available downlink bandwidth threshold used by the UE for traffic steering from E-UTRAN to WLAN |
| $\text{Thresh}_{BackhaulRateULWLAN,Low}$ | Backhaul available uplink bandwidth threshold used by the UE for traffic steering from WLAN to E-UTRAN |
| $\text{Thresh}_{BackhaulRateULWLAN,High}$ | Backhaul available uplink bandwidth threshold used by the UE for traffic steering from E-UTRAN to WLAN |
| $\text{Thresh}_{BeaconRSSIWLAN,Low}$ | Beacon RSSI threshold used by the UE for traffic steering from WLAN to E-UTRAN |
| $\text{Thresh}_{BeaconRSSIWLAN,High}$ | Beacon RSSI threshold used by the UE for traffic steering from E-UTRAN to WLAN |

Background: Mobility States in Telecommunications Standards

In addition to allowing for WLAN interworking, current telecommunications standards provide mechanisms for quantifying or classifying mobile device motion, i.e., the mobility of mobile devices. Here, mobility may refer not necessarily to ability for motion, but rather to motion or movement itself, as described above with regard to the term "mobility" in the glossary section.

In particular, existing telecommunications standards have defined certain mobility states to categorize the states of motion of mobile devices, as determined according to various factors. The mobility state of a mobile device may designate a degree of movement, or motion, that the mobile device has been determined to be experiencing (or that the mobile device is estimated or anticipated to experience). For example, as of Release 8, 3GPP has defined three mobility states for mobile devices: normal mobility, medium mobility, and high mobility. Similarly, current versions of UMTS define two mobility states: normal mobility and high mobility. To determine its current mobility state, a mobile device (e.g., mobile device 106) may consider the number of reselection or handover events it has performed during a time period defined by its network. The mobility states of mobile devices may be considered in various processes performed by the mobile devices and by the network, such as certain wireless communications operations.

Significantly, existing WLAN interworking mechanisms fail to account for the mobility states of mobile devices in handover evaluation processes. For example, the 3GPP Release 12 Framework does not consider the mobility state of the mobile device when determining whether or when to initiate handover. This absence of motion-related considerations in handover processes may be negligible when the mobile device is stationary, i.e., not in motion; however, if the mobile device is experiencing a certain degree of motion (i.e., is mobile), then not accounting for this motion may negatively affect network and device resources, device connectivity, and/or WLAN interworking operations in general. For example, a mobile device that is in a high state of motion while performing offloading to a target WLAN access point may be likely to exit the access point's coverage area prior to or soon after the completion of offloading, thereby wasting device or network resources involved in the offloading processes and possibly disrupting device connectivity, which may necessitate further handover operations.

It may be desirable to avoid scenarios in which a mobile device transitions (or attempts to transition) from a cellular base station to a WLAN access point if the mobile device is unlikely to remain within the WLAN access point's coverage area for a reasonable amount of time. If such a transition were to occur, the mobile device may only briefly benefit from the connection with the WLAN access point before losing this connection, whereupon further handover to another WLAN access point or back to the cellular base station would be required to maintain or restore mobile device connectivity. This undesirable scenario may result in the mobile device undergoing frequent repeated transitions, "ping ponging" between WLANs and the cellular network, which may result in increased battery usage and a degraded user experience.

The potential of a mobile device that is in a state of motion to exit the effective range of a WLAN access point is especially worthy of consideration due to the shorter range of WLAN access points in general. WLAN access point coverage areas are typically much smaller than those of cellular (e.g., LTE or UMTS) base stations; for example, the range of a WLAN access point may be around 100 meters in a typical outdoor configuration, or around only 20 to 40 meters in a typical indoor configuration. Even a mobile device experiencing a low degree of movement, e.g., a mobile device moving at about 1 m/s (3.6 km/hr), may traverse the coverage area of an outdoor WLAN access point in less than two minutes, or that of an indoor WLAN access point range in half a minute.

Thus, it may be desirable to consider both motion-related aspects of mobile devices (e.g., the mobility states of the mobile devices) and characteristics of WLAN access points (e.g., whether access points are indoor or outdoor configurations) in WLAN interworking systems. These additional considerations may serve to improve WLAN interworking in various ways. Embodiments described below relate to mechanisms by which the mobile device may consider various additional criteria in transitioning between cellular and WLAN (e.g., from cellular to Wi-Fi), such as current or anticipated mobility (movement) of the mobile device and a configuration or locations of proximate WLAN access points.

Figure 9:
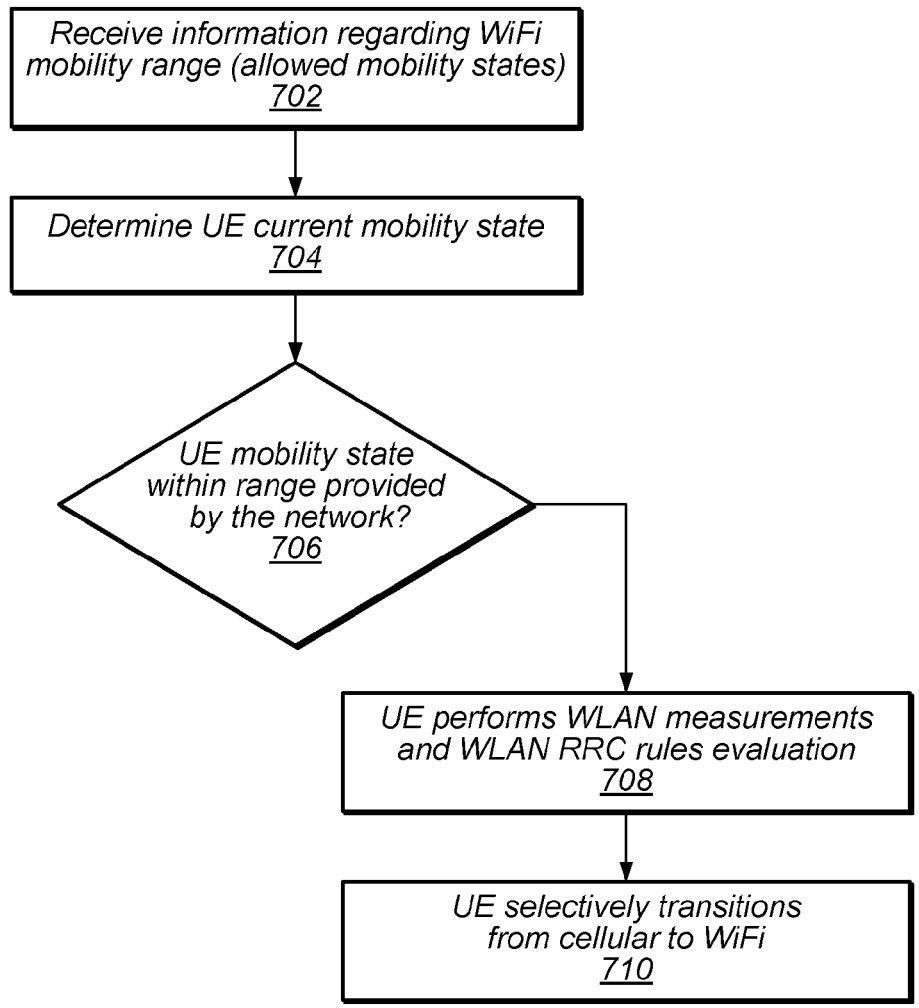
FIG. 9 is a flowchart diagram illustrating operation of the mobile device selectively transitioning from cellular to Wi-Fi, according to some embodiments.

FIG. 9—Flowchart Diagram Cellular to Wi-Fi Handover

FIG. 9 is a flowchart diagram illustrating some embodiments of methods for selectively transitioning a mobile device between using different radio access technologies (RATs). Although FIG. 9 illustrates the specific case of offloading the mobile device from a cellular network to a Wi-Fi network, this handover flow is merely one example, and similar techniques may be used to determine transitioning to or from various types of networks, such as from a short-range RAT or WLAN to a cellular network (or vice versa).

At 702 the mobile device may receive information usable for traffic steering, i.e., information usable in directing mobile device communications between different wireless networks. In some embodiments certain traffic-steering information may be generated autonomously by the mobile device. Alternatively, or in addition, the mobile device may receive the information from the source network, i.e., the network on which it is presently operating. For example, if the mobile device is currently communicating over a cellular network, as in the example scenario represented by the figure, then this information may be received from a cellular base station, i.e., from the cellular network. In this case, the traffic-steering information may be usable to determine WLAN handover, e.g., offloading from the cellular network to Wi-Fi.

In some embodiments, the traffic-steering information may comprise movement-related information. The mobile device may receive information regarding (or usable in determining) motion-related rules, thresholds, or other parameters that would assist in regulating handover operations. In particular, this information may be usable in determining the maximum degree of mobile device motion for which it may be desirable or acceptable for the mobile device to proceed with traffic handover. If the state of motion of the mobile device is categorized into one of a plurality of possible mobility states, as described above, the traffic-steering information may then indicate acceptable or "authorized" mobility states of the mobile device, that is, the mobility states in which the mobile device would be allowed to perform handover.

In particular, according to embodiments illustrated by the example figure, the traffic-steering information received in 702 may take the form of one or more of: (1) a list of authorized mobility states for cellular to WLAN offloading; (2) a threshold of mobility state for cellular to WLAN offloading; and/or (3) a mobility state threshold per WLAN access point if there are multiple proximate access points. In some embodiments, if the cellular network is an LTE or LTE-A network, then the mobile device may receive this mobility state information in an SIB17 or RRCreconfiguration message. If the cellular network is a UMTS network, the mobile device may receive the mobility state information in an SIB23 or UTRAN mobility information message. The received traffic-steering information may also comprise a list of neighboring Wi-Fi access points and respective mobility state information associated with each access point.

Thus, the traffic-steering information may include or account for information regarding one or more possible target networks, i.e., networks to which the mobile device is considering transitioning. In the example case of determining offloading to Wi-Fi, the traffic-steering information may include or account for configuration information regarding one or more Wi-Fi access points that are proximate to the mobile device. This access point configuration information may take the form of information regarding a range of each Wi-Fi access point, e.g., whether each Wi-Fi access point is an indoor access point with a first smaller range or an outdoor access point with a second larger range. If the respective Wi-Fi access point has a smaller range, the mobile device may be required to be in a lower mobility state (e.g., lower mobility than a first smaller threshold) to contemplate transitioning from a current cellular connection to this Wi-Fi access point. If the respective Wi-Fi access point has a larger range, the mobile device may be able to be in a higher mobility state (e.g., lower mobility than a second higher threshold) to be considered for transitioning from a current cellular connection to this Wi-Fi access point. As an example, if the respective Wi-Fi access point has a smaller range, the mobile device may only considered to be a candidate for Wi-Fi offloading if the mobile device is in the low mobility state, and thus at 702 the mobile device receives information indicating the low mobility state to be acceptable or authorized. If the Wi-Fi access point has a larger range, the mobile device may be considered as a candidate for Wi-Fi offloading if the mobile device is in one of the low mobility or normal mobility states, and in this instance at 702 the mobile device receives information indicating that the low mobility and normal mobility states are authorized for handover.

According to various embodiments, the access point configuration information may be obtained and/or evaluated by various means. In the example case of determining Wi-Fi offloading, the cellular network may use its own fingerprint map of Wi-Fi access points proximate to the mobile device to obtain the access point configuration information, e.g., the indoor/outdoor ranges of these access points. The cellular network may also (or instead) query the one or more Wi-Fi access points proximate to the mobile device to determine their configuration information.

From the access point configuration information, e.g., the indoor/outdoor ranges of the access points, the network may be able to estimate the authorized mobility state(s) that would allow the mobile device to transition from cellular to Wi-Fi. In some embodiments, the cellular network may also communicate the Wi-Fi access point configuration information (or approximate ranges of the access points) to the mobile device, and the mobile device may use this information to assess the mobility states in which it should transition from cellular to WLAN.

Alternatively, in some embodiments the mobile device may determine its authorized mobility states independently. The mobile device may autonomously detect a configuration of one or more proximate Wi-Fi access points, e.g., may detect whether the access points are in indoor or outdoor locations using its sensor, and may then determine a range of mobility states for possible transitioning.

At 704 the mobile device may determine its state of motion. Mobile device motion may be classified or quantified using one or more parameters or values, such as a mobility or speed value, e.g., ranging from 1 to 10 (with 1 representing no or low mobility and 10 representing high mobility), among other options. In particular, the degree or nature of the mobile device's movement—namely, the speed of its movement—may be categorized as one of a plurality of possible mobile device mobility states as mentioned above.

In some embodiments, these possible mobility states may be based on existing 3GPP standards, such as the existing three mobility states for LTE and the existing two mobility states for UMTS. However, it may be desirable to increase the number of defined mobility states so that a more precise or granular determination of motion may be used for handover decisions.

As mentioned above, current implementations of LTE define only three mobility states: normal mobility, medium mobility, and high mobility. Some embodiments as proposed herein introduce a new LTE mobility state, low mobility, to describe static or very low-motion mobile devices, i.e., mobile devices that are stationary or nearly stationary. LTE mobility states according to these embodiments then form the following hierarchy, arranged in order from low-motion to high-motion states: low mobility, normal mobility, medium mobility, and high mobility.

Similarly, current UMTS standards define only two mobility states: low mobility and high mobility. In some embodiments, two additional mobility states are introduced such that mobile device motion is categorized into four mobility states similar to the LTE embodiments described above. These two additional mobility states include low mobility to describe static or low-motion devices and medium mobility to describe medium-motion devices. In this way, UMTS embodiments may use a hierarchy of mobility states similar to that proposed for LTE embodiments as described above. Thus, the mobile device may be configured with the following ranking of possible mobility states: low mobility, normal mobility, medium mobility, and high mobility.

Examples of mobility-related WLAN framework extensions for LTE and UMTS are shown in the appendix of the provisional application, incorporated by reference above. Note that other embodiments may implement any of various arrangements comprising existing and/or new mobility states.

In order to determine the state of motion, e.g., the mobility state, of the mobile device, one or more of various mechanisms may be used. In some embodiments, the mobile device's mobility state may be dependent on the number of cell reselections and/or handovers the mobile device has performed during a certain period of time. This period of time, or delay, may be defined by the source network, e.g., by the cellular network. For example, in some LTE and UMTS embodiments, the mobile device when in idle mode may be determined to be in the low mobility state if it has not performed cell reselection or handover during a delay T_CRMAX broadcast by the cellular network. In some UMTS embodiments, if the mobile device has performed at least a certain threshold number of reselections/handovers during T_CRMAX, it may be determined to be in the medium mobility state instead. This threshold number used for determining the medium mobility state in UMTS may be defined by the cellular network.

Various other techniques, or combinations of techniques, may be used by the mobile device to assess and categorize or quantify its state of motion, e.g., its mobility state. In some embodiments, internal sensors or logic internal to the mobile device, such as motion sensors, a gyroscope, GPS circuitry, and/or other components, may be used to determine the nature of movement being experienced by the mobile device. In some embodiments the mobile device may use internal sensors and triangulation techniques to determine one or more of its location, topology, and mobility state. In some embodiments the mobile device may also utilize information regarding which applications are currently executing to aid in assessing its mobility state. For example, an active map/navigation application, e.g., providing driving instructions for a selected route from point A to point B, may indicate a high mobility state.

In some embodiments, the mobile device may estimate its future mobility state, and use information regarding one or both of its current mobility state and its future mobility state to assess whether to perform handover. Estimation of future mobility state (e.g., estimation of mobility state over the next 5 to 60 minutes) may be based on heuristics and detected patterns of previous behavior.

In various embodiments and scenarios the mobility state determination at 704 may take place before or after the mobile device receives the traffic-steering information at 702.

At 706 the mobile device may evaluate the traffic-steering information received at 702 in conjunction with its state of motion as determined at 704 to determine whether or how to proceed with handover operations. In particular, if considering offloading to Wi-Fi, at 706 the mobile device may determine whether its current mobility state as determined at 704 is within the range of mobility state(s) provided by the cellular network at 702, e.g., for a specific candidate Wi-Fi access point. If so, then the access point becomes a candidate for Wi-Fi offloading, i.e., for transitioning from cellular to Wi-Fi. If the mobile device's mobility state is not within the range of authorized mobility states for the Wi-Fi access point, the mobile device may (at least temporarily) discontinue considering handover to the Wi-Fi access point, and may proceed to operate over the cellular network and/or to consider transitioning to other Wi-Fi access points.

If the current mobility state of the mobile device is within the range of mobility state(s) provided by the cellular network, then at 708 the mobile device may proceed to perform further handover evaluation. Here the mobile device may perform various WLAN measurements and/or evaluate WLAN radio resource control (RRC) rules to assess the desirability (e.g., the signal strength) of the Wi-Fi network (the proximate Wi-Fi access point). Example RRC rules according to existing telecommunications standards are detailed above.

By performing further handover evaluation operations only after evaluating its state of motion, the mobile device expends power to perform these handover operations (e.g., to further evaluate the target Wi-Fi access point by determining its signal strength, etc.) if the mobility state of the mobile device indicates that a transition from cellular to Wi-Fi would be possible or desirable. Thus, if the current mobility state of the mobile device is sufficiently high such that Wi-Fi offloading would not make sense, then the mobile device may not perform WLAN measurements and/or handover evaluation at 708.

According to some embodiments, if the mobility state is deemed too high (e.g., higher than a threshold), the mobile device may (temporarily) disable WLAN monitoring processes and/or scanning for Wi-Fi offloading. If the current mobility state later becomes lower than a threshold, the mobile device may re-enable WLAN monitoring processes and scanning for Wi-Fi offloading. This may serve to reduce battery power expenditure of the mobile device, since the mobile device may not waste power performing WLAN measurements, access point scanning, or RRC rules evaluation in situations where it is moving too quickly to justify performing or attempting to perform handover. (Embodiments that integrate motion/mobility considerations into handover evaluations, e.g., into existing RRC rules, rather than evaluate motion/mobility primarily as a prerequisite to these evaluations, are described below with regard to FIG. 10.)

At 710 the mobile device may selectively transition from the source network, e.g., the cellular network, to the target network, e.g., the Wi-Fi access point, based on various factors, including one or more of the WLAN measurements performed at 708, cellular connection signal strength measurements, and the current mobility state of the mobile device. The mobile device may evaluate WLAN/cellular traffic-steering criteria previously discussed and present in current telecommunications standards, among other possible information.

Figure 10:
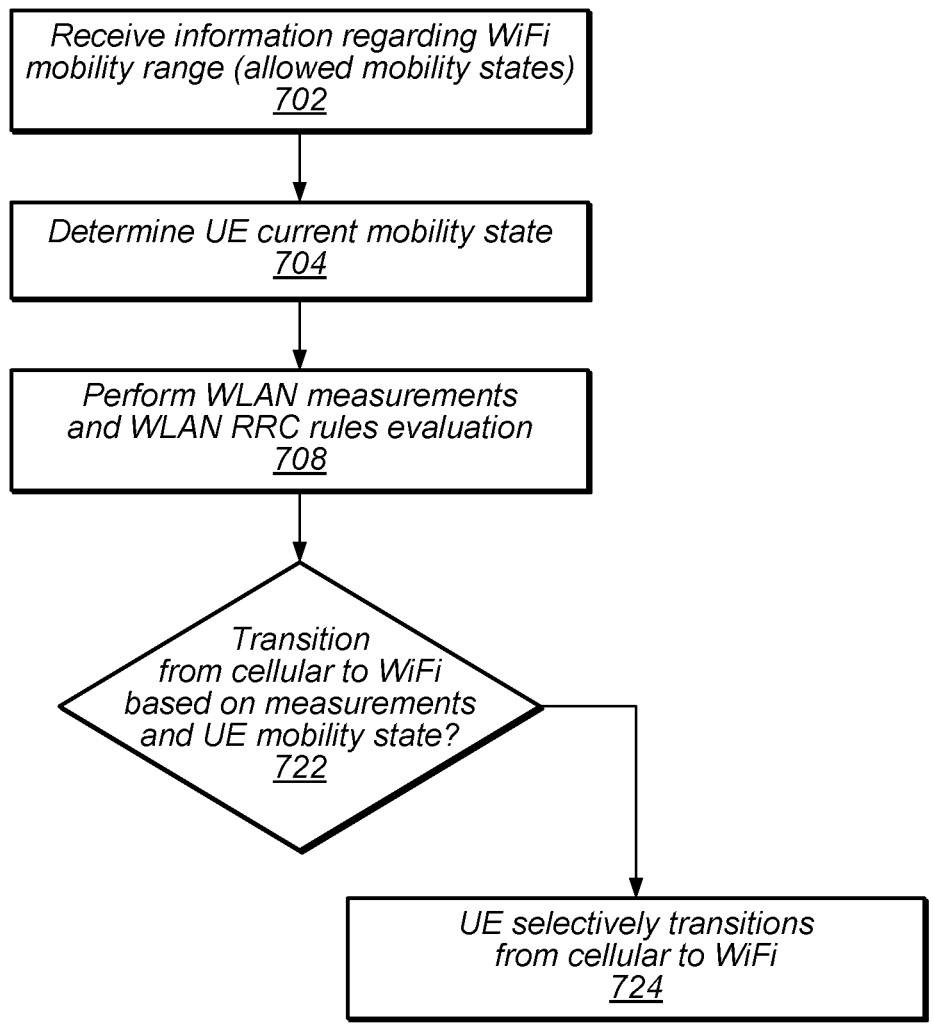
FIG. 10 is a flowchart diagram illustrating operation of the mobile device selectively transitioning from cellular to Wi-Fi, according to some embodiments.

FIG. 10—Flowchart Diagram Cellular to Wi-Fi Handover

FIG. 10 is a flowchart diagram illustrating further embodiments of methods for selectively transitioning a mobile device between using different radio access technologies (RATs). As with FIG. 9, FIG. 10 illustrates the specific case of offloading the mobile device from a cellular network to a Wi-Fi network, although similar techniques may be used to determine transitioning to or from various types of networks, such as from a short-range RAT or WLAN to a cellular network (or vice versa). In particular, according to embodiments illustrated in FIG. 10, factors regarding the state of motion (e.g., the mobility state) of the mobile device are incorporated into handover evaluation processes, rather than evaluated primarily as a precursor or prerequisite to further evaluation processes as described with regard to FIG. 9.

At 702 the mobile device receives traffic-steering information, i.e., information usable in directing mobile device communications between different wireless networks. As described above with regard to FIG. 9, this traffic-steering information may include information regarding proximate access points as well as allowable device motion, such as authorized mobility states that would allow the mobile device to transition to particular access points. At 704 the mobile device may determine its state of motion, namely its mobility state (as described with regard to FIG. 9 above).

At 708 the mobile device may perform various evaluation processes to determine whether to initiate handover. In the example scenario, in which the mobile device may be considering offloading to Wi-Fi, the mobile device may perform WLAN measurements and/or WLAN interworking rules evaluation, such as the RRC rules evaluation outlined in the 3GPP Release 12 Framework as described above. Motion-related considerations may be incorporated into these evaluations. For example, the mobile device's mobility state may be introduced directly in the above-described WLAN interworking rules for offloading from LTE to Wi-Fi as follows (the bolded text indicates the addition):

1. In the E-UTRAN serving cell:
RSRPmeas<Thresh$_{ServingOffloadWLAN, LowP}$; or
RSRQmeas<Thresh$_{ServingOffloadWLAN, LowQ}$.
AND
mobility state<WLAN-Mobility-Threshold-r12; or
mobility state=WLAN-Mobility-State-r12.
2. In the target WLAN:
ChannelUtilizationWLAN<
    Thresh$_{ChannelUtilizationWLAN, Low}$; and
BackhaulRateDLWLAN>Thresh$_{BackhaulRateDLWLAN, High}$; and
BackhaulRateULWLAN>Thresh$_{BackhaulRateULWLAN, High}$; and
BeaconRSSI>Thresh$_{BeaconRSSIWLAN, High}$.

Additionally, the mobile device may incorporate one or more motion-related scaling factors in its determination at 708. In other words, determined device movement may be used to adjust certain handover-related measurement or threshold values such that more motion leads to more stringent conditions for handover, making handover less likely, and less motion allows for handover in less stringent conditions, making handover more likely. For example, according to some embodiments related to WLAN interworking, scaling factors associated with device motion may be used to adjust or "scale" the amount of RSSI (Received Signal Strength Indication) required for Wi-Fi offloading. If the mobile device is in a higher mobility state (is determined to be moving more quickly) then a larger amount of Wi-Fi RSSI may be required to render Wi-Fi offloading desirable. Conversely, if the mobile device is experiencing a low degree of motion, it may be desirable to perform handover despite low RSSI values, and less Wi-Fi RSSI may be required for offloading.

In some embodiments, scaling RSSI rules to account for device mobility may be accomplished by adjusting the beacon RSSI value associated with a particular Wi-Fi access point (i.e., the BeaconRSSI value in the above RRC rules) and/or the relevant RSSI threshold to which it is compared (i.e., the Thresh$_{BeaconRSSIWLAN, High}$ value in the above RRC rules). For example, in a scenario where the device is determined to be in a high state of motion, i.e., a high mobility state, the Thresh$_{BeaconRSSIWLAN, High}$ value may be adjusted upwards (e.g., according to a scaling factor associated with the mobile device's higher mobility state), thereby requiring a higher RSSI value to initiate or allow for handover. In a low-mobility scenario, the $Thresh_{BeaconRSSIWLAN, High}$ value may be scaled downwards to make handover more likely. A similar scaling factor may be used to directly adjust RSSI values associated with particular Wi-Fi access points (instead of the RSSI threshold value), i.e., to adjust the RRC rules' BeaconRSSI value. If the mobile device is in a high mobility state, the BeaconRSSI value may be adjusted downwards so that the connection quality with the Wi-Fi access point may be required to be more attractive for handover in order to compensate for the mobile device's high state of motion, which detracts from the desirability of handover. Conversely, if the mobile device has a lower mobility state, the BeaconRSSI may be adjusted upwards.

According to various embodiments, the above-mentioned scaling factors may be maintained or modified by the mobile device and/or received from the cellular network, e.g., as part of the traffic-steering information received at 702. In some LTE embodiments, motion-related scaling factors may be conveyed to the mobile device using SIB17 or RRCreconfiguration messages. In UMTS embodiments, scaling factors may be sent in SIB23 or UTRAN mobility information messages. According to some embodiments, the scaling factor values may be associated with corresponding mobility states. For example, in embodiments with four mobility states, each mobility state may be associated with one of four corresponding scaling factor values. Alternatively, there may be a greater number of possible scaling factor values, each corresponding to an estimated range of a proximate Wi-Fi access point.

At 722 the mobile device may determine whether it should perform handover based on the handover evaluation performed at 708. For example, the mobile device may determine when or whether to transition from cellular to Wi-Fi based on one or more of the WLAN measurements/rules evaluation performed at 708, the Wi-Fi mobility range information received at 702, and the mobility state determined at 704, among other possible criteria. As described above, one or more scaling factors may be used such that an increased amount of Wi-Fi RSSI is needed for transitioning from cellular to Wi-Fi when the mobile device is in a higher mobility state.

If at 722 the mobile device determines that it should initiate handover, then at 724 the mobile device may proceed with handover and transition from the source network, e.g., the cellular network, to the target network, e.g., the Wi-Fi network. Thus, at 724 the mobile device may finally offload from the cellular base station to a Wi-Fi access point in order to perform wireless communications over a Wi-Fi connection.

Embodiments of the present disclosure may be realized in any of various forms. For example, various embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs. For example, some or all of the units included in the mobile device may be implemented as ASICs, FPGAs, or any other suitable hardware components or modules.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A mobile device, comprising:
   a first radio configured to communicate wirelessly with a cellular base station over a cellular link;
   a second radio configured to communicate wirelessly with a wireless local area network (WLAN) access point over a WLAN link;
   wherein the mobile device is configured to:
      receive information regarding cellular/WLAN offloading;
      determine a level of allowable motion for offloading based at least in part on the received information regarding cellular/WLAN offloading, wherein the level of allowable motion for offloading indicates a maximum amount of movement at which the mobile device is allowed to transition from the cellular base station to the WLAN access point;
      determine a level of device motion, wherein the level of device motion indicates an amount of movement of the mobile device;
      compare the level of device motion to the level of allowable motion for offloading;
      determine a measured received signal strength indicator (RSSI) of the WLAN access point;
      compare the measured RSSI of the WLAN access point to an RSSI threshold, wherein the mobile device uses at least one scaling factor to adjust one or more of an amount of the measured RSSI or the RSSI threshold;
      determine whether the mobile device should transition from the cellular base station to the WLAN access point based at least in part on the comparison between the measured RSSI of the WLAN access point to the RSSI threshold and on the comparison between the level of device motion and the level of allowable motion for offloading, wherein the mobile device determines not to transition if the level of device motion exceeds the level of allowable motion for offloading; and
      selectively transition from the cellular base station to the WLAN access point based on the determination.

2. The mobile device of claim 1,
   wherein the at least one scaling factor is based on a configuration and/or estimated range of the WLAN access point.

3. The mobile device of claim 1,
  wherein the information regarding cellular/WLAN offloading comprises information regarding authorized mobility states of the mobile device for transitioning from the cellular base station to the WLAN access point;
  wherein the at least one scaling factor comprises a scaling factor for each of at least a plural subset of the mobility states.

4. The mobile device of claim 1,
  wherein in determining whether the mobile device should transition from the cellular base station to the WLAN access point, the mobile device is configured to perform a radio resource control rules evaluation procedure; and
  wherein the comparison of the level of device motion to the level of allowable motion for offloading is performed as part of the radio resource control rules evaluation procedure.

5. The mobile device of claim 1,
  wherein the information from the cellular base station regarding allowable motion for offloading is conveyed to the mobile device using a system information block (SIB) type 17 (SIB17) or RRCreconfiguration message if the cellular base station operates using LTE, or an SIB type 23 (SIB23) or Universal Terrestrial Radio Access Network (UTRAN) mobility information message if the cellular base station operates using Universal Mobile Telecommunications Service (UMTS).

6. An apparatus for managing the radio access of a wireless device, the apparatus comprising:
  a non-transitory memory medium;
  at least one processing element operatively coupled to the non-transitory memory medium, wherein the processing element is configured to execute program instructions stored on the non-transitory memory medium to:
    receive traffic-steering information from a cellular base station, wherein the traffic-steering information is usable in transitioning the apparatus between a cellular radio access technology (RAT) and a short-range RAT;
    generate mobility information, wherein the mobility information indicates an amount of movement of the apparatus;
    determine a measured received signal strength indicator (RSSI) of the short-range RAT;
    compare the measured RSSI of the short-range RAT to an RSSI threshold, wherein the mobile device uses at least one scaling factor to adjust one or more of an amount of the measured RSSI or the RSSI threshold;
    determine whether the apparatus should transition between the cellular RAT and the short-range RAT based at least in part on each of the comparison between the measured RSSI of the short-range RAT to the RSSI threshold, the traffic-steering information, and the mobility information; and
    selectively transition between the cellular RAT and the short-range RAT based on the determination.

7. The apparatus of claim 6,
  wherein the generated mobility information is based on a number of handover or reselection events the apparatus has performed over a time interval, wherein a higher number of handover or reselection events indicates a higher amount of movement and a lower number of handover or reselection events indicates a lower amount of movement.

8. The apparatus of claim 6,
  wherein the generated mobility information is based on internal sensors or logic internal to the apparatus, such as one or more of one or more motion sensors, gyroscopes, global positioning system (GPS) circuitry, and/or other components.

9. The apparatus of claim 6,
  wherein the at least one scaling factor is based at least in part on the generated mobility information.

10. The apparatus of claim 6,
  wherein the processing element is further configured to receive information from the cellular base station regarding scaling factors, and
  wherein the at least one scaling factor is based at least in part on the information regarding scaling factors.

11. The apparatus of claim 6,
  wherein the short-range RAT is a wireless local area network (WLAN) provided by a WLAN access point, and
  wherein the at least one scaling factor is applied to one of a beacon RSSI value (BeaconRSSI) associated with the WLAN access point or a $\text{Thresh}_{BeaconRSSIWLAN,\ High}$ value associated with the WLAN access point.

12. A method for managing the radio access of a wireless device, the method comprising:
  receiving, at the wireless device, traffic-steering information, wherein the traffic-steering information is usable in transitioning the wireless device between a cellular radio access technology (RAT) and a short-range RAT;
  generating mobility information, wherein the mobility information indicates an amount of movement of the wireless device;
  determining a measured received signal strength indicator (RSSI) of the short-range RAT;
  comparing the measured RSSI of the short-range RAT to an RSSI threshold, wherein the wireless device uses at least one scaling factor to adjust one or more of an amount of the measured RSSI or the RSSI threshold;
  determining whether the wireless device should transition between the cellular RAT and the short-range RAT based at least in part on each of the comparison between the measured RSSI of the short-range RAT to the RSSI threshold, the traffic-steering information, and the mobility information; and
  selectively transitioning between the cellular RAT and the short-range RAT based on the determination.

13. The method of claim 12,
  wherein the traffic-steering information is generated at least in part based on access point configuration information, wherein the access point configuration information is based on a configuration and/or estimated range of one or more access points of the short-range RAT proximate to the mobile device.

14. The method of claim 13,
  wherein the access point configuration information indicates whether each of the one or more short-range access points is an indoor or outdoor access point.

15. The method of claim 13,
  wherein the traffic-steering information is received from the one or more access points.

16. The method of claim 12,
  wherein the traffic-steering information is received from a cellular base station.

17. The method of claim 12,
  wherein the mobility information comprises a current mobility state,
  wherein determining whether the wireless device should transition between the cellular RAT and the short-range RAT based at least in part on the mobility information comprises determining that the current mobility state is an authorized mobility state.

18. The method of claim 17, wherein the current mobility state comprises one of: low mobility, normal mobility, medium mobility, and high mobility.

19. The method of claim 12, wherein the short-range RAT is a wireless local area network (WLAN) RAT.

* * * * *